Patented July 7, 1953

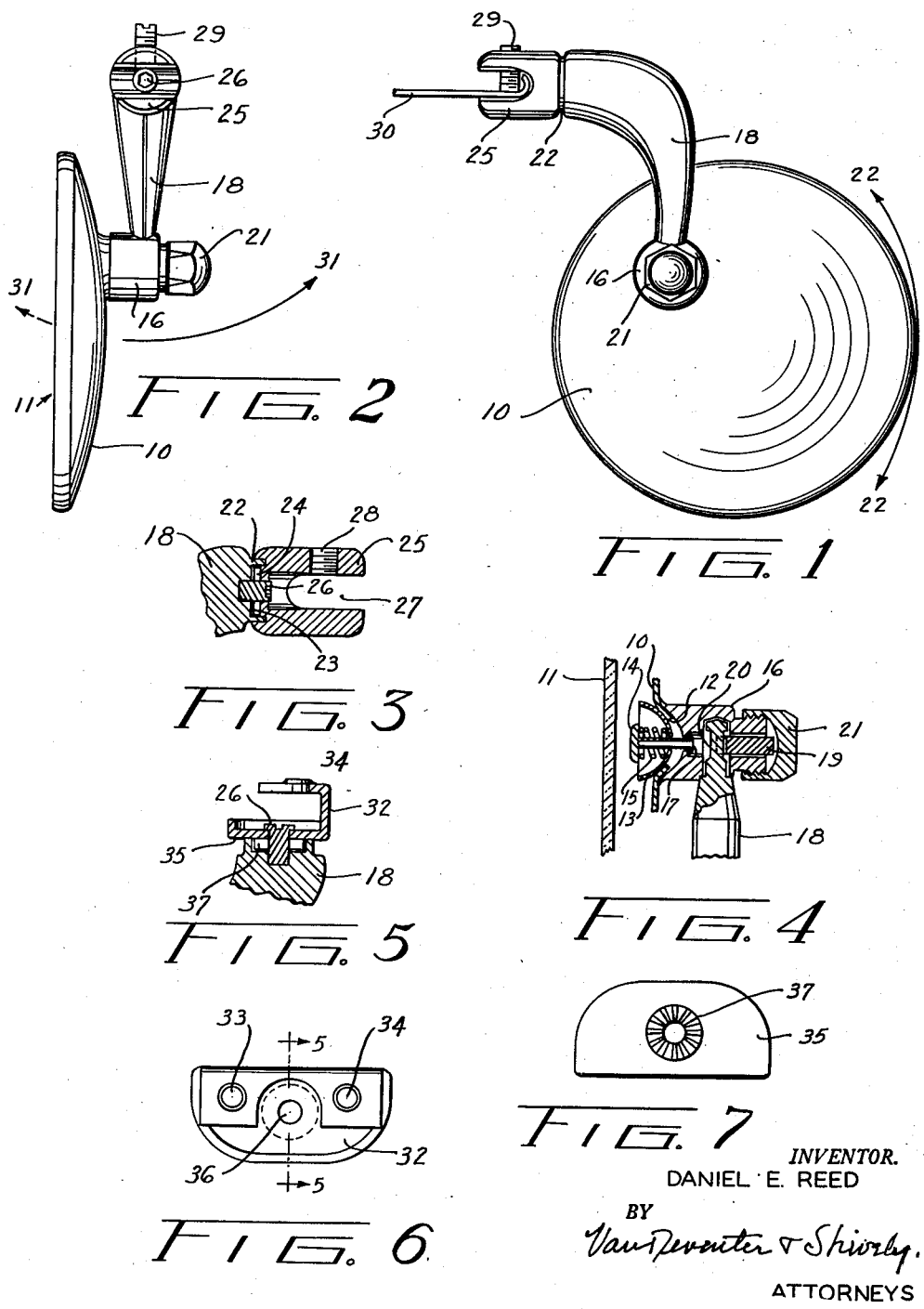

2,644,658

UNITED STATES PATENT OFFICE 2,644,658

REARVIEW MIRROR APPARATUS

Daniel E. Reed, Norwalk, Conn., assignor to Supersite Corporation, New York, N. Y., a corporation of New York Application April 12, 1950, Serial No. 155,396

2 Claims. (Cl. 248—226)

This invention relates to improvements in rear view mirror apparatus. An object of the invention is to provide a rear view mirror apparatus including a clamp adapted to be secured to a vehicle, said clamp being provided with an arm which is rotatable about the clamp whereby the arm may be adjusted at various angular positions in respect to said clamp, said arm carrying a stud having its axis perpendicular to the axis of the arm, whereby the stud may be rotated about said arm and clamped thereon in various positions, said stud being secured to a mirror which is adjustable about the stud, this assembly affording an apparatus which is adjustable to meet a wide range of conditions and which is readily adaptable to vehicles of practically any type.

Another object of the invention is to provide an improved rear view mirror apparatus including a clamp adapted to be detachably secured to a part of the vehicle by means of a single screw.

A further object is to provide an apparatus of the class described in which a clamp is provided which may be permanently attached to the vehicle and to which the arm of the mirror apparatus is adjustably secured.

Other objects and advantages will become apparent from the following description taken in connection with the accompanying drawings which disclose a preferred embodiment of the invention. It will be understood, however, that this disclosure is merely illustrative and not limitative of the invention, which is as defined by the appended claims.

In the accompanying drawings:

Figure 1 is a rear view of a rear view mirror apparatus embodying the invention;

Figure 2 is a side view of the apparatus shown in Figure 1;

Figure 3 is a sectional view of the clamp member shown in the preceding figures;

Figure 4 is a sectional view of the stud supporting the mirror member as shown in Figures 1 and 2;

Figure 5 is a section view of an alternate form of clamp;

Figure 6 is a plan view of the clamp shown in Figure 5; and

Figure 7 is a detail view of the clamp shown in Figures 5 and 6.

Referring to Figure 1, the numeral 10 denotes a rear view mirror frame in the front of which, indicated by the numeral 11 in Figure 2, is mounted a suitable mirror. As the mirror may be of any type, and as it may be secured in the frame 10 in any suitable manner, it is not herein described in detail.

The frame 10 has an aperture formed therein, the edge of said aperture being flared outwardly as indicated at 12, Figure 4, and lying within the curved walls of the aperture is a curved washer 13 which receives the shank of a stud 14, the head of said stud engaging a spring 15 which bears against the inner side of the washer as shown.

The parts just described above are assembled together as shown in Figure 4 and to the body 16 of the stud member of the apparatus, by peening over the inner end 17 of the stud. This compresses the spring 15.

The body is cross-drilled to receive the arm 18 the outer end of which has a neck 20 formed therein which lies in line with a plunger 19 fitting in an axial hole in the body. The inner end of this plunger 19 is cut away to fit the reduced neck 20 of the arm 18, and as the plunger 19 is held in place by the nut 21, it will be seen that by loosening said nut, the arm 18 is free to rotate in the body 16 and may be clamped thereto in any desired position.

It will also be seen that because of the frictional engagement of the frame 10 with the body 16 of the stud assembly, the mirror as a whole may be rotated about the stud; that is to say rotated in the direction of the arrows 22, 22, Figure 1, around the axis of the nut 21 of the stud assembly.

Therefore two motions for the mirror have so far been described, the first being the rotation of the mirror around the axis of the nut 21 and, secondly, the rotation of the mirror and the stud assembly including the nut 21, around the axis of the inner end 20 of shaft 18.

The outer end of the arm 18 is provided with a reduced portion 22, and the inner face 23 of the end of the arm is provided with a plurality of serrations, or teeth, adapted to engage serrations, or teeth, on the male part 24 on the clamp 25 which is secured to the arm 18 by means of a clamp screw 26 located at the bottom of the slot 27 in the clamp.

The clamp is provided with a threaded hole 28 to receive a clamp screw 29, by means of which the clamp may be secured to any suitable part of a vehicle, such as the rain-guard or gutter 30 which usually is located above the front door of an automobile on the driver's side.

It will be observed that by loosening the screw 26 the arm 18 may be adjusted to any desired position as indicated by the arrows 31, Figure 2, in relation to the axis of the clamp 25, thus affording a third means of adjustment for the rear mirror assembly.

Referring now to Figures 5 to 7, inclusive, an alternate form of clamp member is shown which may be used instead of the clamp 25, for in many cases it is impossible to use the clamp 25 because the mirror assembly must be supported on the wooden stanchion of a station wagon, or the like, or otherwise attached to some flat surface of the vehicle. This alternate form of clamp will enable this to be accomplished. It will also be observed that both the clamps herein described are interchangeable, no changes or additions to the arm 18 being necessary to accommodate them.

As shown in Figure 5 the clamp 32 is substantially U-shaped and may therefore be either fitted around the edge of a door frame, or the like; or may be attached thereto, or to any flat surface by screws for which the holes 33, 34 are provided.

The lower face 35 of the clamp has an aperture 36 therein adapted to receive the clamp screw 26, and the bottom face 35 is formed with an outward extension 37 which has serrations or teeth so that the teeth thereof engage the serrations on the inner face 23 of the arm 18, so that the arm 18 may be rotated to any desired angular position about the screw 26 and locked in place.

The operation of this clamp in this respect is the same as the clamp 25 previously described.

It will be evident from the foregoing description that this rear mirror apparatus provides a practically universal adjustment for the mirror and also permits a very short arm 18 to be used. This latter advantage is made possible by the fact that the mirror frame 10 is rotatable about the axis of the nut 21 which is off-set from the center of the mirror frame. Therefore, by merely rotating the mirror about the axis of the nut 21, a right-to-left adjustment of the mirror can be effected which will span a greater distance than if the axis of rotation were located at the center of the mirror frame. This adjustment, it will be noted, is always in the plane of the mirror.

The mirror may be tilted from the vertical position shown in Figure 2, as previously described, and in addition, the entire assembly is rotatable around the screw 26, and the mirror assembly is rotatable around the axis of the outer end 20 of the arm 18.

What is claimed is:

1. In combination a clamp member having rigid parallel jaws adapted to embrace part of a vehicle, means carried by said clamp and adapted to contact said vehicle and secure said clamp thereto, an arm, means on said arm and clamp for adjustably securing same together to permit said arm to swing in a plane parallel to the side of a vehicle, said arm having a portion extending at an angle from said clamp, said arm having a stud-engaging portion at its outer end, a stud, and means on said stud including a plunger carried thereby and engaging said stud-engaging portion of said arm to rotatably secure said arm to said stud.

2. In combination a body member having a concave depression in one end and forming a stud having an axial bore extending therethrough, said member being externally threaded at its outer end; said member having a second bore therein extending across said axial bore and adapted to receive the end of a supporting arm; a supporting arm having its end extending into said second bore and lying across said axial bore in said body member; a frame adjustably supported on said body member and having a convex portion fitting into said concave depression; spring pressed means supported by said body member and extending between same and said frame whereby the latter is adjustably held in engagement with the former; a plunger in the axial bore of said body member; and a nut in threaded engagement with said external threads on the outer end of said body member and adapted to engage said plunger to force same against said arm whereby said body and the frame carried thereby may be adjusted relative to said supporting arm.

DANIEL E. REED.

References Cited in the file of this patent

UNITED STATES PATENTS

| Number | Name | Date |
| --- | --- | --- |
| 1,823,636 | Winkler | Sept. 15, 1931 |
| 1,834,682 | Colstad | Dec. 1, 1931 |
| 1,861,148 | Withrow | May 31, 1932 |
| 1,956,518 | Paulus | Apr. 24, 1934 |
| 2,113,251 | Dover | Apr. 5, 1938 |
| 2,450,179 | Anderson | Sept. 28, 1948 |
| 2,452,316 | Morley | Oct. 26, 1948 |
| 2,455,919 | Daon | Dec. 14, 1948 |
| 2,456,362 | Aves | Dec. 14, 1948 |
| 2,520,884 | Laube | Aug. 29, 1950 |